May 28, 1968   H. B. ATWOOD ET AL   3,385,110
LUBRICATOR LEVEL INDICATOR
Filed Dec. 2, 1965

INVENTORS
H. B. Atwood
James N. McLean
BY
ATTORNEYS.

United States Patent Office 3,385,110
Patented May 28, 1968

3,385,110
LUBRICATOR LEVEL INDICATOR
Hyatt B. Atwood, Buffalo, and James N. McLean, Tonawanda, N.Y., assignors to Herr Manufacturing Company, Inc., Buffalo, N.Y.
Filed Dec. 2, 1965, Ser. No. 511,134
3 Claims. (Cl. 73—327)

ABSTRACT OF THE DISCLOSURE

The disclosure relates to lubrication of rings used in the spinning and twisting of yarns and particularly to indicators which indicate at a glance the level of lubricant in the oil cups. The disclosure also shows means for holding the indicators in correct relation to the oil cups or containers.

---

It is consequently an object of this invention to provide indicating means of this type which are readily and accurately positioned on the covers of oil cups and which remain in such positions continuously during the operation of the apparatus.

Another object is to provide an oil level indicator of this type which is also constructed to provide an oil-tight joint between the indicator and the cover.

Figure 1:
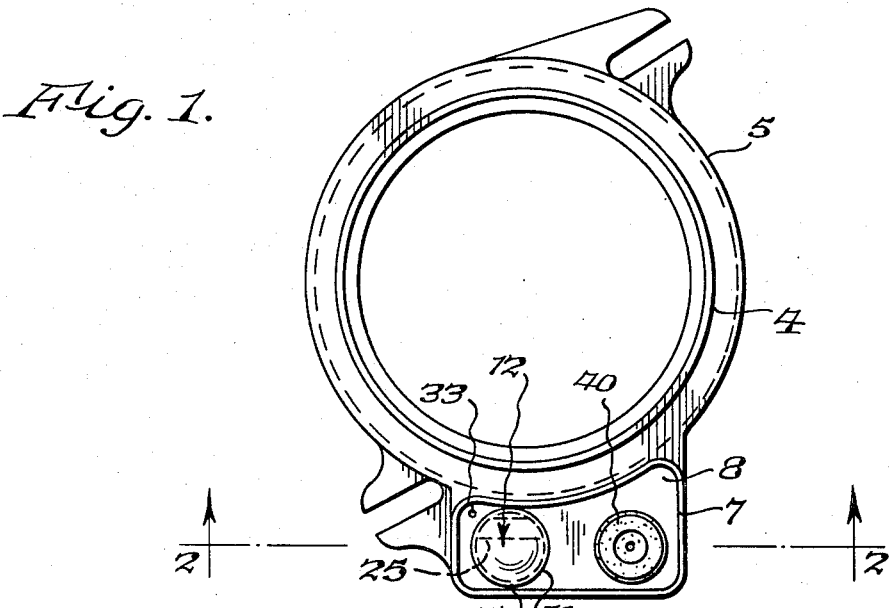
FIG. 1 is a top plan view of a spinning ring and a holder therefor provided with an oil cup having mounted thereon an oil level indicator embodying this invention.
Figure 2:
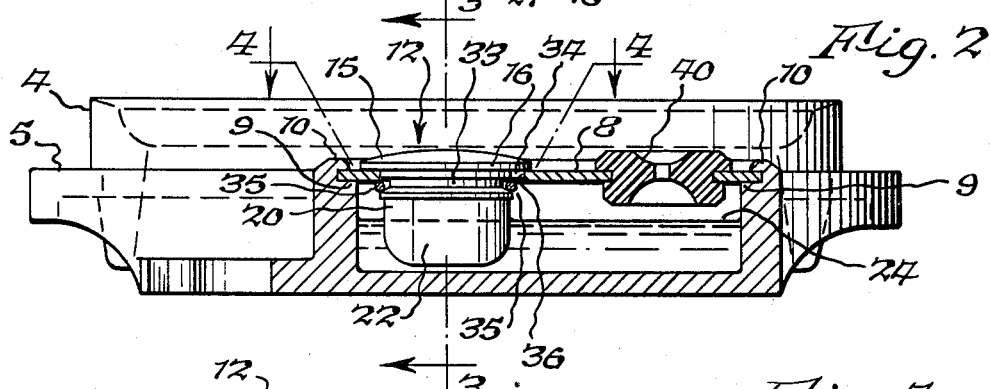
FIG. 2 is a sectional elevation thereof on an enlarged scale on line 2—2, FIG. 1.

4 represents a spinning ring mounted in a holder 5 which is provided at one side thereof with the usual oil cup or reservoir 7, which contains lubricant to be supplied to the bearing surface or surfaces of the ring by means of wicks which extend into the oil cup or by other means. The oil cup has a cover 8 which is in the form of a plate of metal or other suitable material mounted on the upper portion or edge of the oil cup or reservoir 7. Preferably this cover plate rests on a shoulder 9 formed on the upper portion of the walls of the oil cup. These walls extend slightly above the shoulder 9, and the upper edges 10 thereof are flared over on the edge portions of the cover, thus making a permanent, relatively oil-tight connection between the cover and the oil cup. This prevents contamination of the lubicant in the oil cup by foreign matter.

We have provided the cover of the oil cup with a level indicator, generally indicated at 12, which is mounted on the cover 9 and extends downwardly into the oil reservoir through an aperture provided for this purpose in the cover. This oil level indicator in the form shown includes an approximately cylindrical body portion 14 formed to fit snugly into the aperture in the cover plate, and the indicator terminates at its upper end in a convex surface 15 which is of somewhat larger diameter than the body portion and thus forms an annular flange 16 the lower face of which constitutes a shouldered part forming a stop which rests upon the upper surface of the cover plate 8.

Figures 3, 4:
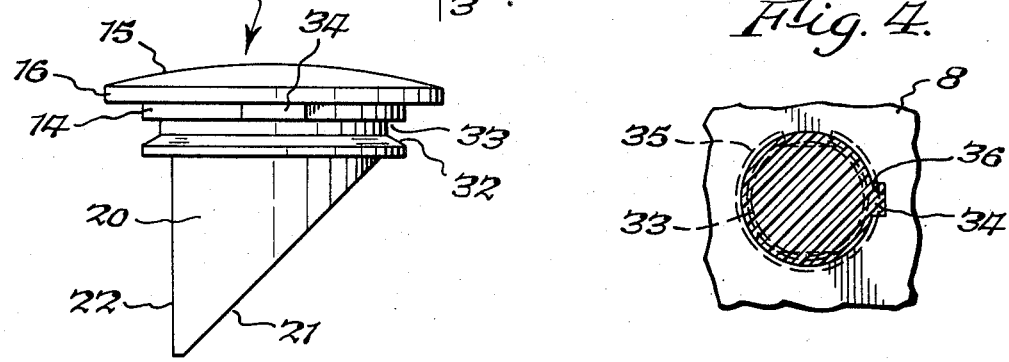
FIG. 3 is an elevation on an enlarged scale of an oil level indicator separate from the oil cup.
FIG. 4 is a fragmentary sectional view on line 4—4 FIG. 2.

The cylindrical body 14 is provided with means for indicating the level of oil in the oil cup, and preferably this is in the form of a transparent, substantially prismatic, downward extension 20, preferably formed integral with the body portion 14 of the indicator and having the lower end thereof extending into proximity to the bottom of the oil cup. This prismatic part has a downwardly inclined face 21 on a side thereof and a straight, upwardly extending face 22 on the other side thereof, as clearly shown in FIG. 3. When the upper surface 24 of the oil in the cup contacts with the inclined surface 21 of the indicator, a line 25 is formed which is clearly visibile by glancing downwardly through the upper convex surface 15. When the oil level in the cup is lower, the magnified line 25 is nearer to the outer edge part 27 of the magnifying surface 15 of the indicator, and conversely when the oil level is higher, the line 25 is farther from this edge.

It is an important feature of this invention to arrange the level indicators on all cover plates in the same relative positions so that the lines seen on the upper surfaces of the indicators will be uniformly located with reference to the spinning rings. Consequently a person inspecting the oil level indicators will readily detect any indicator on which the line 25 is positioned in a different location so that he can quickly find any cup in which the oil level is different from the others. Any suitable holding means may be provided for preventing turning of the indicator and for locating the level indicators in fixed relation to the cover plates of the oil cups, and in the particular construction shown for this purpose we have provided the cover plate with a notch or keyway 36 and have provided on the body portion of the level indicator an outwardly extending projection or key 34 formed to enter into the keyway. Since the cover plates are preferably stamped by means of a die from sheet material, the keyways formed thereon will be uniformly positioned with reference to the dimensions of the cover plates, and since the level indicators are generally made of a molded plastic material, the keys or projections 34 formed thereof will also be uniformly positioned in relation to the prismatic, downwardly extending parts 20 thereof so that in all installations the level indicating lines on the upper surface of the indicator will be uniformly arranged in fixed relation to the cover plates. Consequently, a person inspecting the level indicator can determine at a glance the level of oil or other lubricant present in the oil cup without first having to determine which is the base of the indicator from which the line 25 moves when the oil level changes.

It is also desirable to provide an oil-tight seal between the indicator and the cover plate, and in the construction shown for this purpose we have provided resilient means for continuously exerting a pressure on the indicator urging it to contact with a surface of the cover plate. For this purpose we have provided the body portion 14 of the indicator with a groove 33 extending around the same below the annular flange 16 which also has the projection 34 which cooperates with the keyway or recess 36 in the cover 8. This groove 33 is provided with the upper surface 32 of the lower wall arranged at an inclination extending inwardly and upwardly into the body portion. The upper wall of the groove is preferably arranged below the flange 16 of the body portion to an extent slightly less than the thickness of the cover plate. Within this groove we provide resilient means for urging the level indicator against a surface of the cover plate, and in the construction shown for this purpose, we have provided a spring ring 35 which is applied to the indicator by expanding the same and letting it contract to move resiliently into the groove. This ring is of slightly greater diameter than the thickness of the upper wall of the groove and consequently bears against the inclined lower wall 32 of the groove and the lower surface of the cover plate 8. Thus the level indicator is urged downwardly by the spring ring cooperating with the inclined wall 32, thus urging the flange 16 of the level indicator downwardly against the upper surface of the cover plate to form a seal therewith.

By means of the construction described the level indicator will be positively held in the aperture of the cover plate against turning, so that on all indicators on various machines the lines formed thereon by the oil level will be in the same relative positions. The construction described also forms a tight seal between the cover plate and the upper, enlarged end of the indicator.

The cover plate may also be provided with an oil port 40 of any usual or suitable construction and preferably made of resilient material to fit into another aperture formed in the cover plate. Consequently if access is required to the oil cup, for example, for cleaning the same, the resilient oil port can be readily moved out of its aperture.

It will be understood that various changes in the details, materials and arrangements of parts which have been herein described and illustrated in order to explain the nature of the invention may be made by those skilled in the art within the principle and scope of the invention as expressed in the appended claims.

We claim:
1. A lubricant level indicator for use with an oil cup provided with a cover having an aperture therein,
   (a) said indicator being transparent and having a body portion that fits into said aperture,
   (b) and a part extending below said cover into lubricant contained in said cup to indicate the level of the lubricant therein,
   (c) a shouldered part integral with said body portion and forming a stop to engage said cover,
   (d) said body portion having an annular groove adjacent to said shouldered part, which has a wall which is inclined inwardly toward said cover,
   (e) and resilient means in said groove and engaging said cover and said inclined wall and pressing said shouldered part against said cover.

2. A lubricant level indicator according to claim 1 and including holding means on said level indicator for preventing turning of the same in said aperture, said holding means being held in operative position by said resilient means.

3. A lubricant level indicator according to claim 2 in which said means for preventing turning of said indicator in said aperture constitute cooperating key and keyway on said indicator and said cover.

References Cited
UNITED STATES PATENTS

| | | | |
|---|---|---|---|
| 821,872 | 5/1906 | Hodges et al. | 73—331 |
| 1,394,109 | 10/1921 | Narum | 351—96 |
| 1,883,971 | 10/1932 | Kryzanowsky | 73—327 |
| 2,581,734 | 1/1952 | Triplett | 73—431 |
| 3,331,956 | 7/1967 | Hough et al. | 240—1.2 |

LOUIS R. PRINCE, *Primary Examiner.*

DAVID SCHONBERG, *Examiner.*

D. M. YASICH, *Assistant Examiner.*